M. B. RYAN.
CHAIN MAKING MACHINE.
APPLICATION FILED APR. 7, 1915.
1,175,301.
Patented Mar. 14, 1916.
3 SHEETS—SHEET 2.
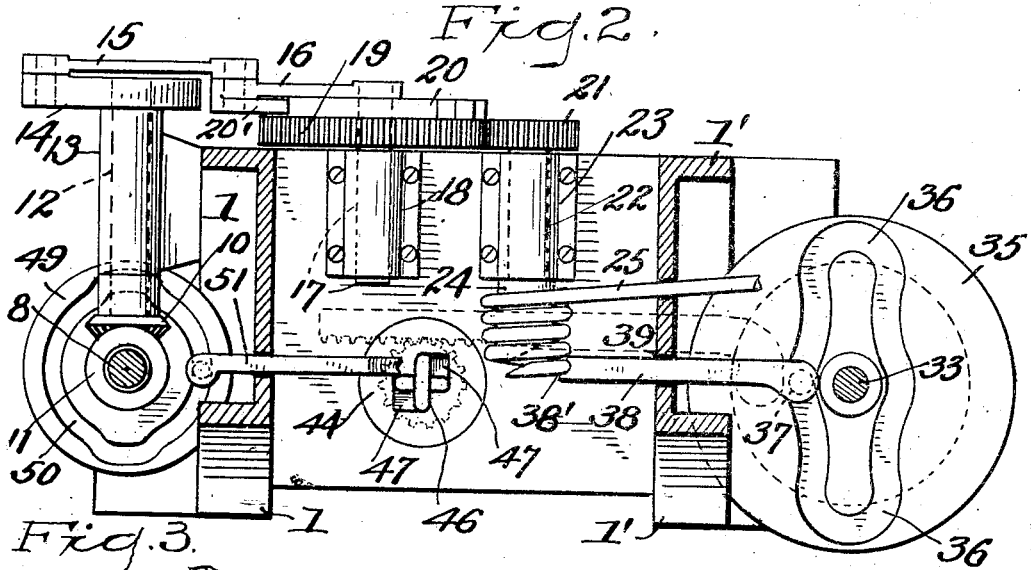
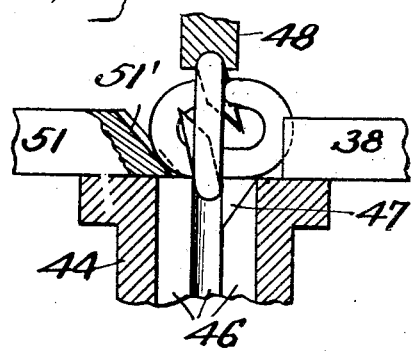
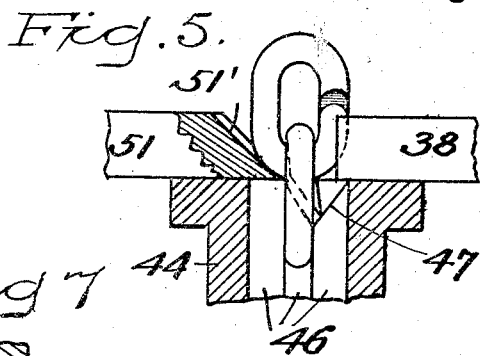
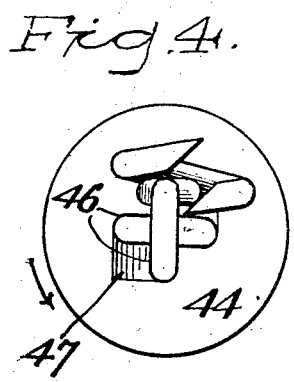
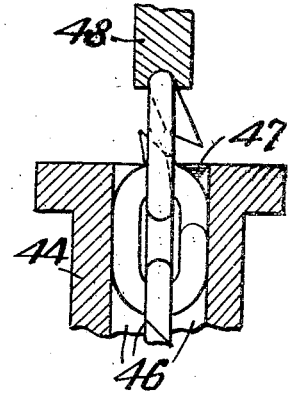
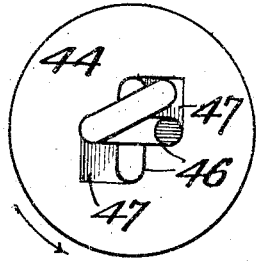
WITNESSES:
M. E. Hitchcock
George Nash
INVENTOR
M. B. Ryan
BY
[signature]
ATTORNEY

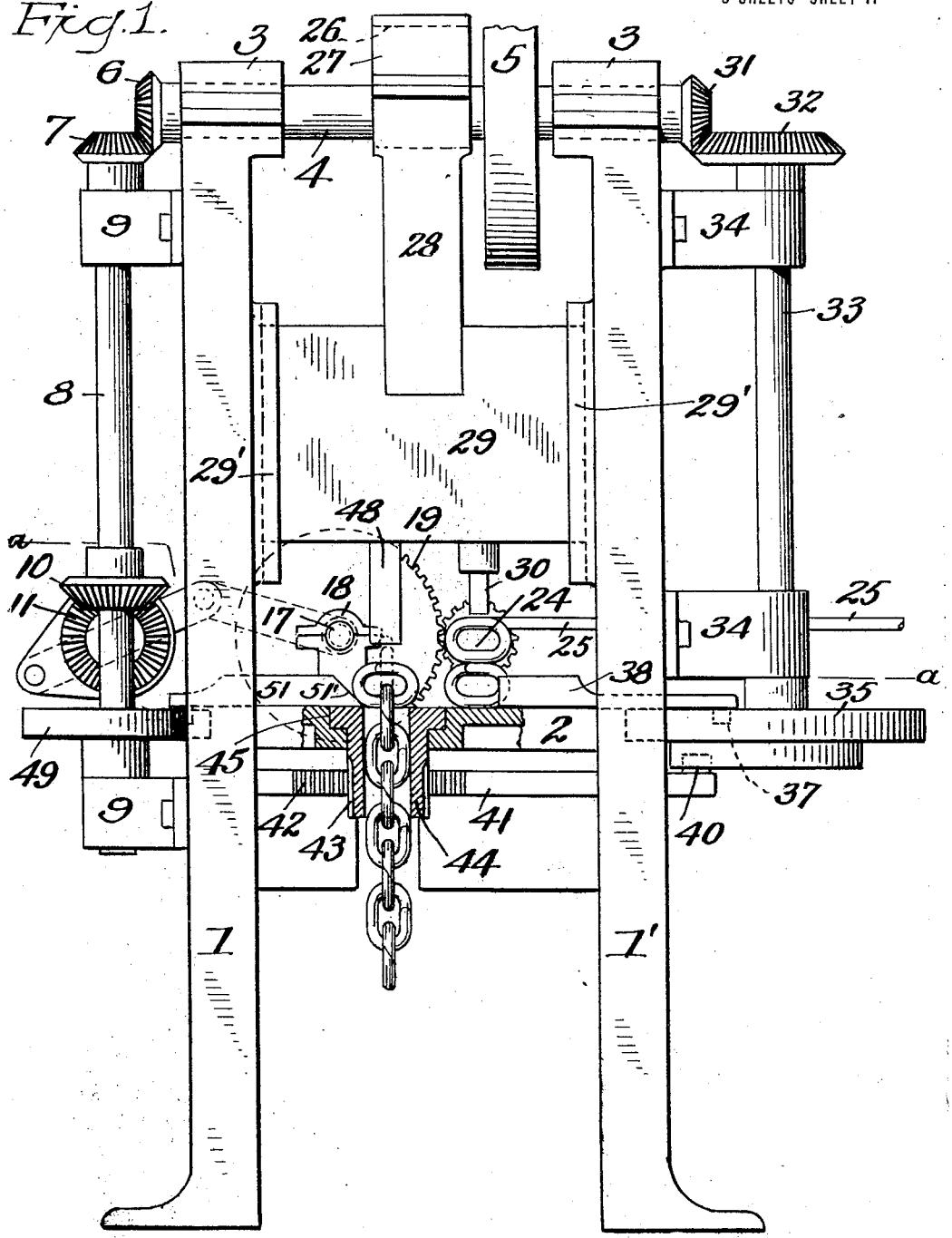

M. B. RYAN.
CHAIN MAKING MACHINE.
APPLICATION FILED APR. 7, 1915.

1,175,301.

Patented Mar. 14, 1916.
3 SHEETS—SHEET 3.

WITNESSES:
M. E. Hitchcock
George Nash

INVENTOR
M. B. Ryan
BY
ATTORNEY

UNITED STATES PATENT OFFICE.

MICHAEL B. RYAN, OF MILFORD, CONNECTICUT.

CHAIN-MAKING MACHINE.

1,175,301. Specification of Letters Patent. Patented Mar. 14, 1916.

Application filed April 7, 1915. Serial No. 19,725.

*To all whom it may concern:*

Be it known that I, MICHAEL B. RYAN, a citizen of the United States, residing at Milford, in the county of New Haven and State of Connecticut, have invented certain new and useful Improvements in Chain-Making Machines, of which the following is a specification.

The invention relates to improvements in chain making machines, and has for its object to provide a machine for making chain automatically from a single strand or coil of metal, the blanks or units being first formed and cut, then interlocked into the last unit of the chain and the ends thereof closed so that the said ends may be welded together to form a solid link, the invention being particularly designed for use in connection with chain welding machines such as those forming the subject matter of my co-pending application filed January 29, 1914, Serial No. 850,210.

A further object of the invention is to provide a machine for making shorter links than has been possible heretofore in automatic chain making machines.

The invention consists in providing a machine in which the units are first formed from a single strand of wire, then cut to produce the blanks, and then successively interlocking the blanks into the last formed units of the chain, and finally in adjusting the ends of the blanks or units into contact with each other so that the said ends may be readily welded together to form solid links.

The invention further consists in certain details of construction, combinations and arrangement of parts as will be hereinafter fully described and then claimed.

Figure 8:
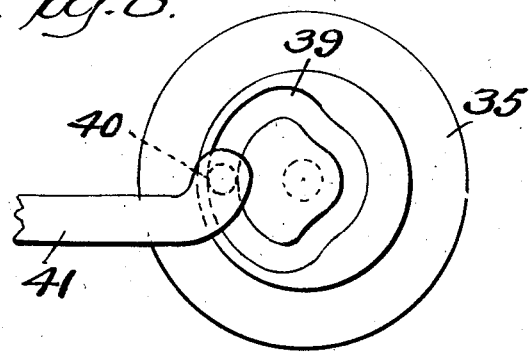
Figure 9:
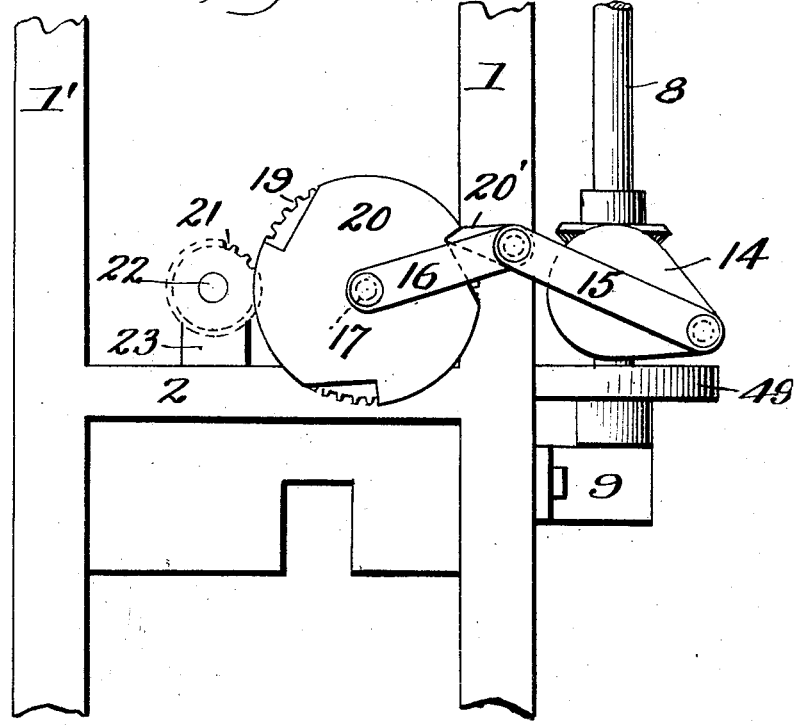

In the drawings illustrating the invention, in the several figures of which like parts are similarly designated, Figure 1 is a front elevation partly in section of my improved machine. Fig. 2 is a horizontal section drawn on the irregular line a—a of Fig. 1. Fig. 3 is a detail sectional view on a slightly larger scale than that shown in Figs. 1 and 2, illustrating the first step of feeding the units or blanks forwardly into interlocking engagement with the preceding formed link. Fig. 4 is a plan view of the same. Fig. 5 is a similar view to Fig. 3 illustrating the manner of adjusting the last interlocked unit or blank from a horizontal to a vertical position to permit the units or blanks being forced through the sleeve. Fig. 6 is a plan view of same. Fig. 7 is a detail sectional view illustrating the means for closing the ends of the blank. Fig. 8 is an inverted plan view of the cam employed for rotating the chain whereby to prevent the latter from becoming twisted. Fig. 9 is a rear view of a portion of the machine illustrating the driving mechanism employed for rotating the mandrel.

1 and 1' designate the side members of the frame of the machine and 2 the bed-plate or table thereof. The upper ends of the side members 1 terminate in bearings 3 in which is mounted the main power shaft 4 carrying a belt pulley 5 around which operates a drive belt, not shown. One end of the shaft 4 is provided with a bevel gear 6 which meshes a similar gear 7 carried at the upper end of a vertical shaft 8 journaled in bearings 9 extending from the side member 1 of the frame, the said shaft 8 also having a beveled pinion 10 secured thereto, which meshes a similar pinion 11 carried at the inner end of a horizontally arranged shaft 12 journaled in a bearing 13 extending from the said side member 1 of the frame, and having a crank arm 14 at its outer end to which is pivotally connected one end of a link 15 having its opposite end pivotally connected to a link 16 keyed upon a shaft 17 journaled in a bearing 18 secured to the bed-plate or table 2. Loosely mounted upon the shaft 17 is a gear wheel 19 having a ratchet disk 20 formed thereon (or secured thereto), which is designed for engagement by a pawl 20' carried by the pintle connecting the links 15 and 16. The gear 19 meshes and drives a pinion 21 carried at the outer end of a shaft 22 which is journaled in a bearing 23 mounted upon the bed-plate or table 2, and the inner end of the shaft 23 terminates in a forming mandrel 24 of suitable shape around which the blanks or units of the chain are formed. The metal 25 extends from a coil of metal (not shown) and is spirally coiled upon the mandrel and then cut.

Upon the shaft 4 is mounted an eccentric 26 upon which operates an eccentric strap 27 having an arm 28 pivotally connected at its lower end to a vertically reciprocating head 29 held in guide-ways 29' extending from the side members 1 and 1' of the frame, and having a cutting tool 30 secured to its lower end which is designed to engage and cut the coil of metal so as to form the units or blanks as will be better understood from the general description of the operation of the machine. The opposite end of the shaft 4, to that carrying the pinion 6, carries a bevel pinion 31 which meshes and drives a bevel pinion 32 carried at the upper end of a vertical shaft 33 journaled in bearings 34 extending from the side member 1' of the frame. The lower end of the shaft 33 carries a disk 35 having a compound cam groove 36 (Fig. 2) formed in its upper face in which operates a roller 37 carried at the outer end of an arm 38 operating over the top of the bed-plate or table and reciprocatingly mounted in a guide groove 39 formed in the side member 1' of the frame, the inner end of the arm 38 being bifurcated as at 38' to receive one end of the units or blanks and to feed them forwardly into the machine and into interlocked engagement with the last link of the chain, as will also be hereinafter further described. The disk 35 has its lower face provided with a cam groove 39 in which operates a roller 40 carried at the outer end of a rack bar 41, the teeth 42 of which being held into mesh with rack teeth 43 formed upon the lower peripheral end of a vertically disposed sleeve 44 rotatably mounted in a bearing 45 formed in the bed-plate or table 2, the said sleeve 44 having intersecting right-angular grooves 46 extending therethrough, through which the chain is forced after the links have been interlocked. In order to close the openings between the ends of the blanks or units, I provide the said sleeve, adjacent to the upper ends of two of the grooves 46, with beveled surfaces 47 as indicated in Figs. 2, 3, 5 and 6, which bevel surfaces are designed to be engaged by the downwardly extending ends of the blanks as they are forced through the sleeve, which action is performed by an arm 48 carried by the head 29, and designed to engage the last interlocked blank of the chain to thus force the links through the sleeve 44, on each descending movement of the head. As illustrated in Figs. 3, 4 and 5, as the cam groove 36 forces the arm 38 forwardly to feed a blank in the machine, the blank is forced into interlocking position with the previously interlocked link, and in the case of oblong links, it will be noted that the links are fed across the bed-plate in a horizontal position. Now in order to turn or adjust them into vertical position so that they may be forced through the sleeve 44, the shaft 8 is provided with a disk 49 having a cam groove 50 in its upper face in which operates a roller carried at the outer end of a reciprocating arm 51, the inner edge of which is beveled as at 51' and designed to engage and turn the blank from its horizontal position to a vertical position, thus adjusting the blanks into position to be forced through the sleeve after they have been interlocked.

A further understanding of the invention will be best had from the following general description of the operation of the machine: The metal from which the links are formed is fed into the machine from a coil mounted upon a suitable reel, (not shown), stationed adjacent to the machine, and is spirally wound upon the mandrel 24 from the base or inner end thereof outwardly, so that the free end of the metal or the end coil will be forced outwardly toward the end of the mandrel as it is wound upon the latter. We will assume that a sufficient number of coils have been wound upon the mandrel so as to bring the end of the metal (or the outer coil) to its end, it, of course, being understood that the power shaft 4 is continuously operating, as is also the shafts 8, 12 and 33. It will also be noted that through the pawl and ratchet movement, the shaft 22, and the mandrel 24 receive an intermittent movement, the gears 19 and 21 being so proportioned that one coil is wound upon the mandrel at each complete revolution of the shaft 4, so that as the coil reaches the end of the mandrel the reciprocating head 29 will be so operated to sever the metal to thus produce a single unit or blank. When the metal is cut by the cutter 30 to produce a blank, the blank is permitted to drop down and rest upon the bed-plate or table 2 in a vertical position and is caught and held at one end in such position in the slotted end of the arm 38 which, as will be understood, is in its extreme rearmost position as shown in Fig. 2. When the blank drops down upon the base and is caught in the slot of the arm 38, and as the shaft 33 continues to revolve, the said arm will then be forced forwardly so as to shove the blank forwardly into interlocking engagement with the previously interlocked blank of the chain, and at this moment the cam 50, acting upon the arm 51, will push the latter arm inwardly as illustrated in Figs. 3 and 5 to thus cause the beveled end 51' of the arm to engage the link and to adjust or turn it so that the loop will be adjusted to assume a vertical position. Now, as the reciprocating head 29 again descends to cut the next blank, the member 48 will also descend with the head and engage the end of the last interlocked blank, it being understood that the links are held in the intersecting grooves, and that it is held from sliding through the grooves by reason of the outwardly extending ends of the link engaging the sides of the grooves and also by reason of the fact that the downwardly extending end of the link is brought into engagement with the beveled portion 47 of the sleeve, thus requiring considerable force to push the link through the grooves of the said sleeve. As the member 48 descends the upwardly extending member of the last link will be adjusted to a vertical position and as the said link is forced through the grooves of the sleeve the bevel face of the downwardly extending end of the link will engage the bevel surface 47 of the sleeve and thus be forced into contact with the bevel face of the upwardly extending end of the link, in other words, closing the ends. It will be noted that by providing the compound cam groove 39, I provide an arrangement for rotating the sleeve first in one direction and then in the opposite direction, one motion taking place on each complete operation of the machine, thereby avoiding twisting the chain which would occur should the sleeve 44 be rotated in one direction only. It will be understood that the cam groove 39 is so proportioned that, on each operation, the sleeve is given only one quarter of a complete revolution so that the loop of the last interlocked blank will always be adjusted at right-angles to the next blank or unit to be interlocked. It will also be understood that the gears are so proportioned that the various operations of the several parts of the machine will be performed in their proper sequence, but as this feature of the invention will be well understood by anyone skilled in the art to which the invention relates, it has not been thought necessary to dwell in detail upon the various movements of the several parts of the apparatus.

From the foregoing, it will be seen that I provide an exceedingly simple and efficient machine whereby the links of a chain are automatically formed and interlocked into a chain. It will also be seen that the metal is cut obliquely with respect to the plane of the link, so that the links are not only more easily interlocked, but there is provided a joint that may be welded in a machine forming the subject matter of the application hereinbefore referred to.

It may be stated that instead of providing the bevel surfaces 47 in the sleeve 44 for closing the ends of the blanks or links in the manner described, that the machine may be so geared that when the arm 48 descends and engages the link, that the latter will be held by the said arm so that when the sleeve is rotated the blank will be twisted to thus close the opening between the ends thereof, or in other words, to bring the ends of the blank into alinement and into contact with each other.

What I claim is:—

1. In a machine for making lap-weld chains from a single strand of metal, a rotatable chain support, a mandrel upon which the metal is wound, a cutter for cutting the metal to form units or blanks, means for interlocking each unit or blank with the last link of the chain, means for forcing the chain through said support whereby to close the openings in the links, means for rotating said chain support for the purpose specified, and means for operating said interlocking means.

2. In a machine for making lap-weld chains from a single strand of metal, a rotatable chain supporting sleeve, a mandrel upon which the metal is wound, means for operating said mandrel, a cutter for cutting the metal to form the units or blanks, means for successively feeding the severed units or blanks into interlocked engagement with the last link of the chain, means for forcing the chain through the said supporting sleeve, said sleeve serving to close the openings in the links as the chain is forced through said sleeve, and means for rotating said supporting sleeve, as and for the purpose specified.

3. In a machine for making chains from a single strand of metal, a rotatable chain supporting sleeve vertically mounted in the machine and having intersecting right-angular grooves through which the links of the chain pass, a mandrel rotatably mounted upon the machine upon which the metal is wound, a cutter for cutting the metal to form units or blanks, means for feeding the units or blanks into interlocked engagement with the last formed links of the chain, said means serving to hold the blanks in upright position, means for rotating said sleeve whereby to adjust the last link of the chain so that the loop thereof will be arranged at right-angles to the succeeding unit or blank, means for turning the last link of the chain to permit said link to pass through the grooves of said sleeve for the purpose specified, means for forcing the links of the chain through the said sleeve whereby to close the openings in said links, and means for operating the several parts of the machine.

4. In a machine for making chains from a single strand of metal, a rotatable chain supporting sleeve having intersecting right-angular grooves through which the links of the chain are adapted to pass, a rotatable mandrel upon which the metal is wound, a sliding head having a cutter adapted to cut the metal into units or blanks, means for operating said head, a reciprocating bar having a bifurcated end adapted to receive the units or blanks and hold them in upright position, said bar serving to feed the blanks into interlocked engagement with the last link of the chain, means for operating said bar, means for turning the last link of the chain from a horizontal to a vertical position whereby to adjust the last interlocked link of the chain into position to receive the succeeding unit or blank, means carried by said reciprocating head for forcing the chain through said sleeve, and means for imparting intermittent rotary movement to said mandrel.

5. In a machine for making chains from a single strand of metal, a mandrel upon which the metal is wound, means substantially as described, for imparting intermittent rotary movement to said mandrel, means for cutting the metal to form units or blanks, a chain supporting sleeve rotatably mounted in the machine having right-angular intersecting grooves to receive the links of the chain, said sleeve having beveled surfaces merging into said grooves and adapted for the purpose specified, means for successively interlocking the units or blanks with the last link of the chain, means for adjusting the last links of the chain from a horizontal to a vertical position whereby to permit the links to pass through the said sleeve and to adjust the said link so that one end thereof may be brought into contact with one of the beveled surfaces of the sleeve as the links are forced through the said sleeve to thus close the opening in the link.

In testimony whereof I have hereunto set my hand this 1st day of April, A. D. 1915.

M. B. RYAN.

Witnesses:
WILLIAM H. VITALE,
M. E. HITCHCOCK.